United States Patent [19]

Medlin, Sr.

[11] Patent Number: 4,757,908

[45] Date of Patent: Jul. 19, 1988

[54] DUAL SIZE OUTLET BOX MOUNTING BRACKET

[76] Inventor: Lewis B. Medlin, Sr., P.O. Box 23, Blue Ridge, Va. 24064

[21] Appl. No.: 61,469

[22] Filed: Jun. 15, 1987

[51] Int. Cl.[4] .............................................. H02G 3/08
[52] U.S. Cl. ...................................... 220/3.9; 220/3.7
[58] Field of Search ................................ 220/3.9, 3.7

[56] References Cited

U.S. PATENT DOCUMENTS

| | | | |
|---|---|---|---|
| 2,808,172 | 10/1957 | Buckels | 220/3.7 X |
| 2,989,206 | 6/1961 | McAfee | 220/3.7 |
| 4,533,060 | 8/1985 | Medlin | 220/3.9 |
| 4,569,458 | 2/1986 | Horsley | 220/3.9 X |
| 4,688,693 | 8/1987 | Medlin, Jr. | 220/3.9 |

Primary Examiner—Steven M. Pollard
Attorney, Agent, or Firm—B. B. Olive

[57] ABSTRACT

An outlet box (the term "outlet box" is also intended to encompass a junction box) mounting bracket has four groups of slots arranged to accept the shanks of the mounting screws of either a standard small size outlet box or a standard large size outlet box. The bracket includes a portion adapted to be secured to a stud and a front wall with a central opening which registers with the interior of the outlet box. The four groups of slots are substantially at four corners of the central opening. Enhanced support strength is obtained by providing elongated formed depressions on at least one and preferably on at least two opposed edges of the front wall.

14 Claims, 5 Drawing Sheets

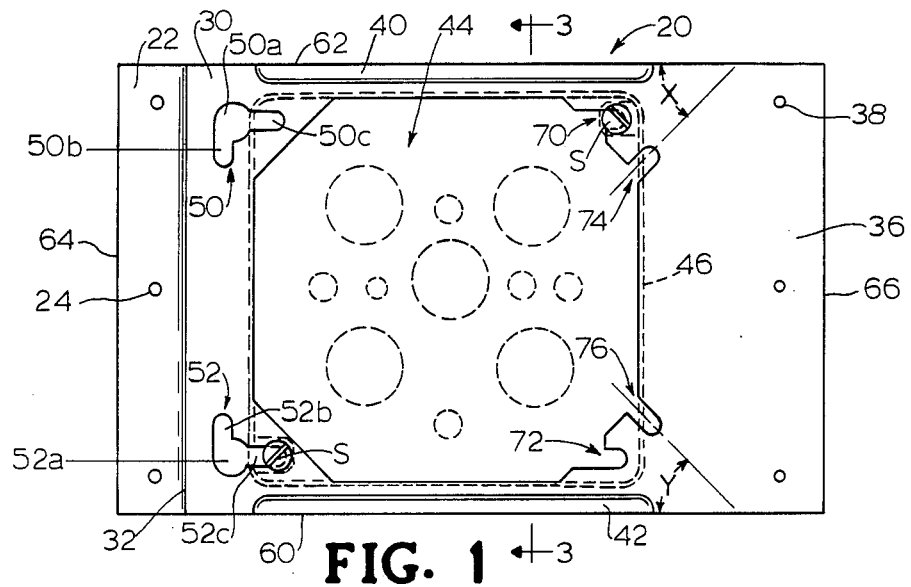
FIG. 1
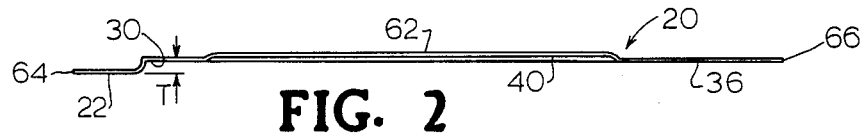
FIG. 2
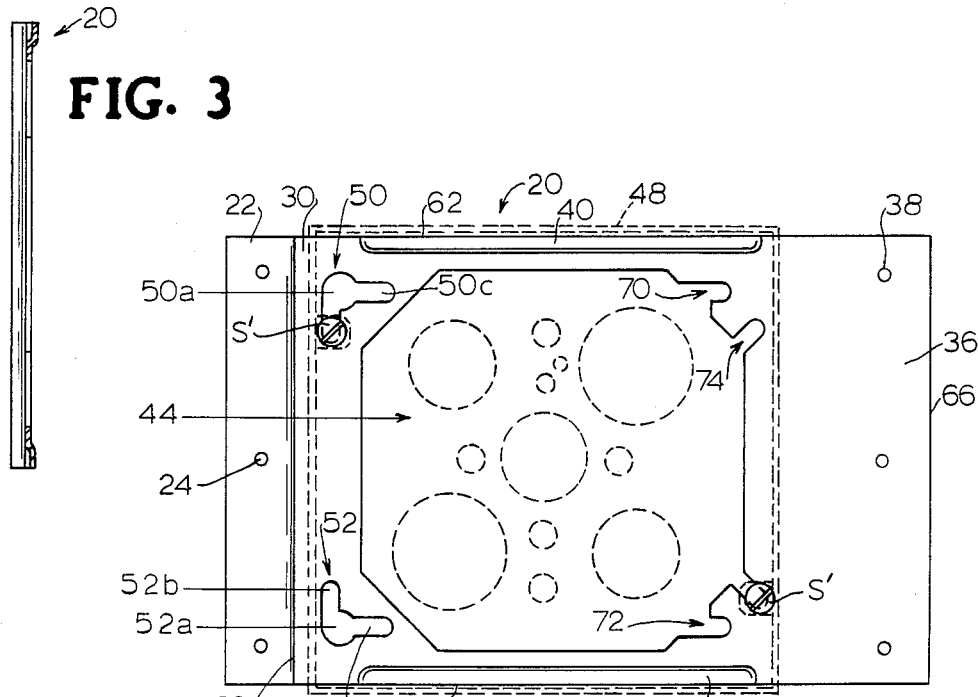
FIG. 3
FIG. 4

DUAL SIZE OUTLET BOX MOUNTING BRACKET

REFERENCE TO RELATED APPLICATION

The present invention relates to copending application Ser. No. 893,228, filed Aug. 4, 1986, by Lewis B. Medlin, Jr. for "Outlet Box Bracket With Stabilizer" now U.S. Pat. No. 4,688,693 and Ser. No. 922,894, filed Oct. 23, 1986, by the present applicant, Lewis B. Meldin, Sr. for "Outlet Box With Adjustable Stabilizer" now U.S. Pat. No. 4,732,356.

FIELD OF THE INVENTION

The present invention relates to brackets for mounting of electrical equipment and more specifically for mounting an electrical outlet or junction box (hereafter referred to only as an outlet box) on a vertical metal stud, wooden stud, or the like, during building construction and/or repair.

DESCRIPTION OF THE RELATED ART

What is believed to be a sufficient description of the background art related to mounting brackets for outlet boxes will be found in U.S. Pat. Nos. 1,206,431; 1,795,224; 4,135,337; 4,399,922; 4,533,060; 4,569,458; and 4,572,391. As disclosed in U.S. Pat. No. 4,533,060 electrical outlet boxes are conventionally used in two sizes. One size referred to as a small size is of square shape with each side being approximately four inches in length. Another size, referred to as the large size, has sides which are approximately 4—11/16 inches in length. Manufacturers of outlet box mounting brackets have generally provided a small size bracket for accepting the small size outlet box and its associated dry wall ring and a large size bracket for accepting the large size outlet box and its associated dry wall ring. As an exception to this practice, U.S. Pat. No. 4,569,458 teaches an outlet box mounting bracket with two sets of screw holes such that the same bracket can mount either the standard small size or the standard large size outlet box and the respective associated dry wall ring. However, since the holes are sized to receive the screw shanks, a disadvantage of the hole arrangement in the referred to U.S. Pat. No. 4,569,458 is that the fastening screws must be removed from the outlet box and reinstalled before the outlet box is mounted on the bracket. In a large building construction in which large quantities of outlet boxes are installed, the necessity for removing and replacing the outlet box screws adds considerably to the time factor in completing the electrical work on the job. Outlet boxes made by different manufacturers while similar in size may vary as much as ⅛" with respect to the same dimension. Thus, any arrangement for mounting the screws must accommodate to this variation.

It would thus be desirable to provide a mounting bracket suited to mounting either a small size or a large size outlet box without having to remove and reinstall the screws on the outlet box and without having to install the dry wall ring until the wires have been run to the outlet box and all joints in the outlet box completed. The achieving of such a mounting bracket becomes the principal object of the invention.

The referred to prior art also teaches the advantage of having a stiffening arm for stabilizing the bracket after installation such as illustrated, for example, in U.S. Pat. Nos. 4,399,922 and 4,572,391.

Another object thus becomes that of providing an improved mounting bracket which can be used to mount either a small size or a large size outlet box and with an associated improved stiffening arm. Other objects will appear as the description proceeds.

DISCLOSURE OF INVENTION

With the described prior art in mind, the present invention discloses a mounting bracket having a unique screw slot arrangement such that either a small, i.e., 4 inch square, or a large, i.e., 4—11/16 inch square, size outlet box can be mounted on the bracket and without requiring that the plaster or dry wall ring be attached until after the electrician has run his wires and made up the required joints within the outlet box. The unique screw slot arrangement of the invention readily adapts to variations in the size of outlet boxes obtained from different manufacturers. Four embodiments are illustrated, two of which incorporate a stiffening arm in association with the improved dual size outlet box mounting arrangement. The four embodiments describe three different arrangements of slots for receiving the mounting screws.

BRIEF DESCRIPTION OF DRAWINGS

FIG. 1 is a front elevation view of a first embodiment generally flat dual size outlet box mounting bracket according to the invention with a small size outlet box illustrated in dashed lines in a typical mounted position.

FIG. 2 is a top plan view of the FIG. 1 bracket.

FIG. 3 is a section view taken along line 3—3 of FIG. 1.

FIG. 4 is a front elevation view of the FIG. 1 bracket with a large size outlet box shown in dashed lines in a typical mounted position.

BEST MODE FOR CARRYING OUT THE INVENTION

Figure 5:
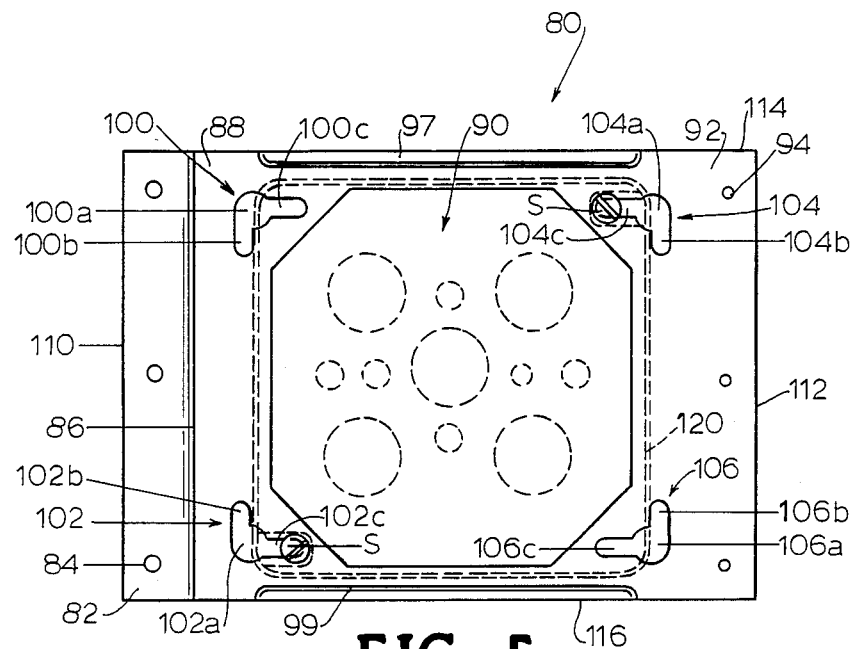
FIG. 5 is a front elevation view of a second embodiment generally flat dual size outlet box mounting bracket providing a different slot arrangement from that illustrated in FIGS. 1-4 and showing in dashed lines a small size outlet box in a typical mounted position.
Figure 6:
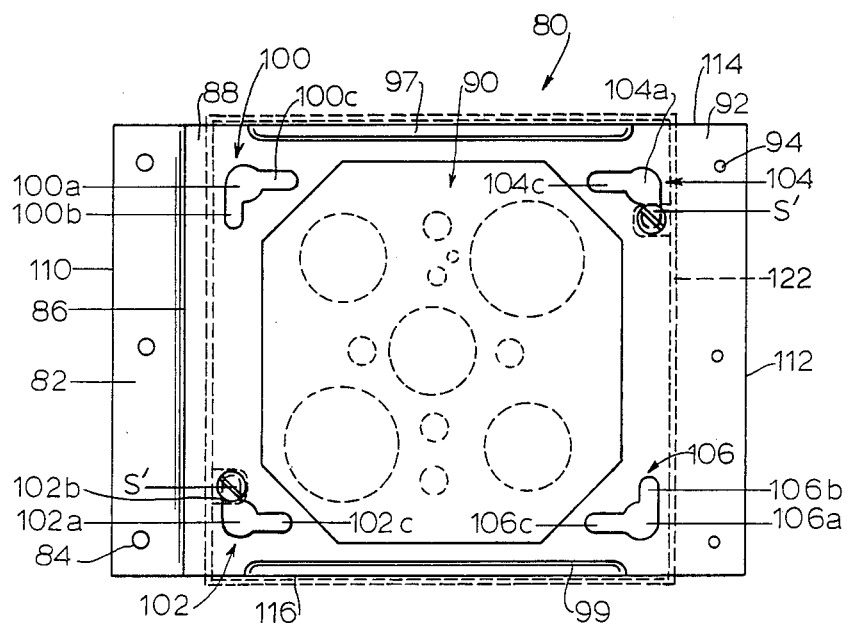
FIG. 6 is a front elevation view of the FIG. 5 bracket with a large size outlet box shown in dashed lines in a typical mounted position.
Figure 7:
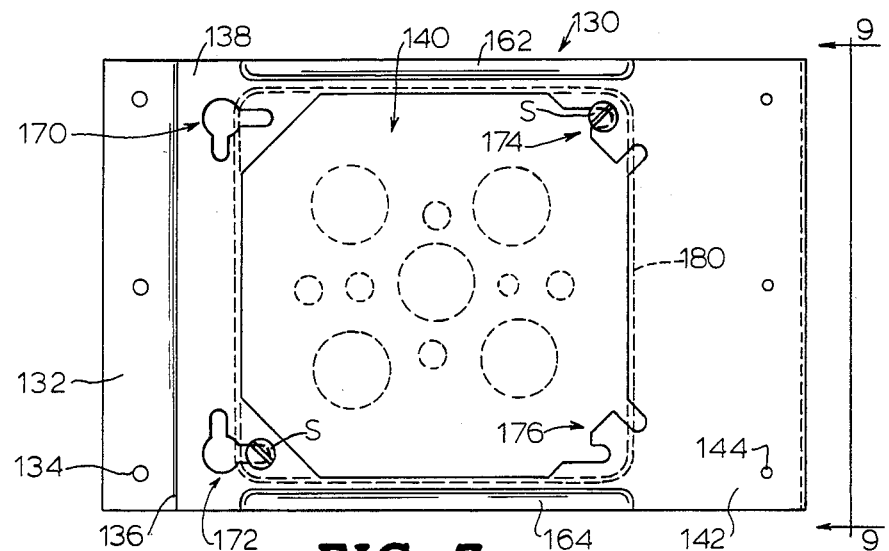
FIG. 7 is a front elevation view of a mounting bracket according to a third embodiment of the invention having an integral stiffening arm providing a generally L-shape and with a small size box shown in dashed lines in a typical mounted position.

With the referenced prior art in mind, a first embodiment of the present invention is illustrated in FIGS. 1-4, a second embodiment in FIGS. 5-6, a third embodiment in FIGS. 7-10 and a fourth embodiment in FIGS. 11-14. All embodiments are characterized by being formed of relatively thin sheet metal formed by pressing, punching or die cutting operations appropriate to sheet metal fabrication. The first two embodiments are generally of flat shape, the third embodiment generally of L-shape and the fourth embodiment generally of T-shape. All embodiments are illustrated as having an opening substantially equal in size to the size of the opening in the small size outlet box.

Making reference initially to FIGS. 1-4, the first embodiment bracket is designated by the numeral 20 and is generally flat without a stiffening arm as illustrated in later embodiments. Generally, rectangular bracket 20, formed of relatively thin but rigid sheet metal, includes a first rectangular end portion 22 formed with a plurality of holes 24 for securing the bracket 20 to a vertical stud. End portion 22 is bounded by offset 32 and continues to extend laterally outward from offset 32 as flat mounting section 30 bounded at its outer end by end portion 36. End portion 36 also includes a plurality of holes 38 enabling one bracket 20 to be attached to another bracket 20 in piggyback fashion or for receiving an extension plate or another type bracket in the general manner set forth in FIGS. 29-31 of prior U.S. Pat. No. 4,572,391. Pressed depressions 40, 42 serve to stiffen the central web portion 30 on either side of the opening 44 providing access to the selected outlet box such as the illustrated small outlet box 46 in FIG. 1 or the large outlet box 48 in FIG. 4. Formed depressions 40, 42 provide mounting bracket 20, when secured, with both stiffness and increased ability to support the weight of the outlet box and related wiring and fittings in the outlet box. The electrician is thus able to pull wiring, make up joints and the like without fatiguing the bracket. The presence of the formed depressions 40, 42 also permits the central opening 44 to be of maximum size and minimizes the amount of material required to form the bracket to gain the necessary supporting strength in the bracket.

Of particular interest to the present invention is the presence of the slots at the four corners of the opening 44 enabling either a small size outlet box 46 or the large size outlet box 48 to be attached to the bracket 20 according to need. In particular, there is provided a pair of interconnected, closed keyhole slots 50, 52. Slot 50 includes a clearance opening 50a through which the head of the outlet box mounting screws may be passed and slot openings 50b, 50c for selectively receiving the shanks of the mounting screws. In a similar manner, the closed slot 52 includes a central screw head clearance opening 52a and a pair of screw shank slots 52b, 52c. The central axes of slots 50c, 52c extend generally parallel to the edges 60, 62 of bracket 20 whereas the central axes of slots 50b, 52b extend generally parallel to the edges 64, 66 of bracket 20. As best illustrated in FIGS. 1 and 4, bracket 20 also includes a pair of screw shank receiving open slots 70, 72, the central axes of which extend generally parallel to edges 60, 62 of bracket 20 and a separate set of screw shank receiving open slots 74, 76 with the respective central axes thereof being at approximately 45 degrees as indicated by the included angles X and Y in FIG. 1. Slots 70, 72, 74, and 76 all lead from access opening 44 as illustrated.

In use, the small size box 46 is installed with its mounting screws S in place as illustrated in FIG. 1 whereas the large size box 48 is installed with its mounting screws S' in place as illustrated in FIG. 4. Thus, bracket 20 may accommodate either the small or large size outlet box thereby eliminating the need to remove the outlet box mounting screws S or S' before mounting or to provide different size brackets for the respective two different size outlet boxes. Furthermore, slots 50, 52, 70, 72 readily accommodate to the irregularities in size of outlet boxes obtained from different manufacturers which as previously mentioned may be as much as $\frac{1}{8}$ inch. After the necessary wiring, joints, and the like, are completed, the dry wall ring, not shown, may be installed as described in the prior patents with the thickness T (FIG. 2) being substantially equal to the thickness of the dry wall ring so as to provide a substantially smooth surface in the finished work. The small outlet box 46 is mounted such that the formed depressions 40, 42 adjacent opening 44 are located outside outlet box 46. The large outlet box 48 by comparison when mounted has the formed depressions 40, 42 within the boundaries of the box. Thus, with either the large or small outlet box the opportunity for cutting or tearing off the wiring insulation is minimized when pulling in the wires, making up joints and the like.

The second embodiment bracket 80, like the first embodiment bracket 20, is of substantially flat construction and includes an end portion 82 with stud fastening holes 84 bounded by an offset 86 similar to the previously explained offset 32. Extending outwardly from offset 86 is the central web portion 88 containing the outlet box access opening 90 and terminating in an end portion 92 having a plurality of holes 94 for receiving an extension plate, another bracket of similar construction, or another bracket of different construction, in the manner previously described. Formed depressions 97, 99 stiffen the bracket in the manner of formed depressions 40, 42 of FIG. 1.

The second embodiment bracket 80 is characterized by a slot formation differing from the slot formation used in the first embodidment bracket 20. In particular, bracket 80 includes four closed interconnected double keyhole slots 100, 102, 104 and 106. Each of the slots contain respective screw head clearance openings designated 100a, 102a, 104a, and 106a. The respective axes of screw shank receiving slots 100b, 102b, 104b, and 106b are generally parallel to the edges 110, 112 of the generally rectangular shaped bracket 80. The other respective shank receiving slots designated 100c, 102c, 104c, and 106c have their respective axes oriented substantially parallel to the other edges 114, 116 of bracket 80. In use, it will be noted that the small size outlet box designated 120 in FIG. 5 or a large size outlet box designated 122 in FIG. 6 may be accommodated by the same mounting bracket 80 by positioning the respective mounting screws S or S' in the manner illustrated.

FIGS. 7-10 illustrate a third embodiment which unlike the substantially flat construction of the first two embodiments assumes an L-shape and includes a stiffening arm as next described. Bracket 130 of the third embodiment comprises an end portion 132 having a plurality of holes 134 for securing bracket 130 to a vertical stud, or the like. End portion 132 is bounded by offset 136 from which extends the central portion 138 containing the central opening 140 providing access to the outlet box and opposite opening 140 includes an end portion 142 with a plurality of holes 144 for receiving an extension plate, another bracket of the same construction or another bracket of different construction as previously explained. Extending at a right angle from end portion 142 is a stiffening arm portion 150 having an opening 152 for receiving wire or conduit and a pair of leg portions 154, 156 bendable on lines 154', 156' to accomodate to wall spacing and holes 160 for securing bracket 130 to a stud, or the like, when desired. Formed depressions 162, 164 reinforce bracket 130 in the same manner as previously referred to formed depressions 40, 42 of FIG. 1.

The third embodiment bracket 130 includes a pair of closed interconnected keyhole slots 170, 172 and also an open-ended slot pair 174 and open-ended slot pair 176. Since the slot arrangement shown in FIGS. 7-10 is generally similar to the previously explained slot arrangement of FIGS. 1 and 4, it will be apparent that the small size box designated 180 in FIG. 7 can be installed as in FIG. 7 and the large size box designated 182 can be installed as illustrated in FIG. 10 utilizing the respective mounting screws S or S'. The stiffening arm 150 operates in the manner explained in the referenced prior art patents and has particular advantage in the present invention in providing an additional time-saving feature by accommodating to different spacings between interior walls on which the mounting bracket is being installed by bending legs 154, 156 as required.

Figure 8:
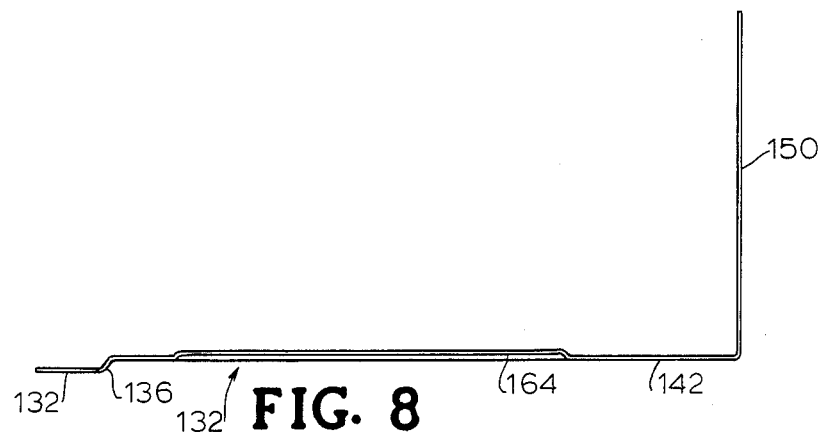
FIG. 8 is a top plan view of the FIG. 7 bracket.
Figure 9:
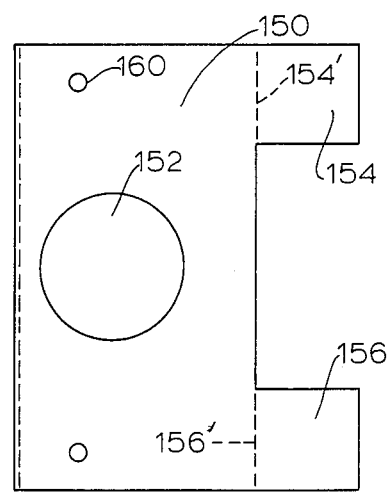
FIG. 9 is an end view of the FIG. 7 bracket and integral stiffening arm taken in the direction of line 9—9 of FIG. 7.
Figure 10:
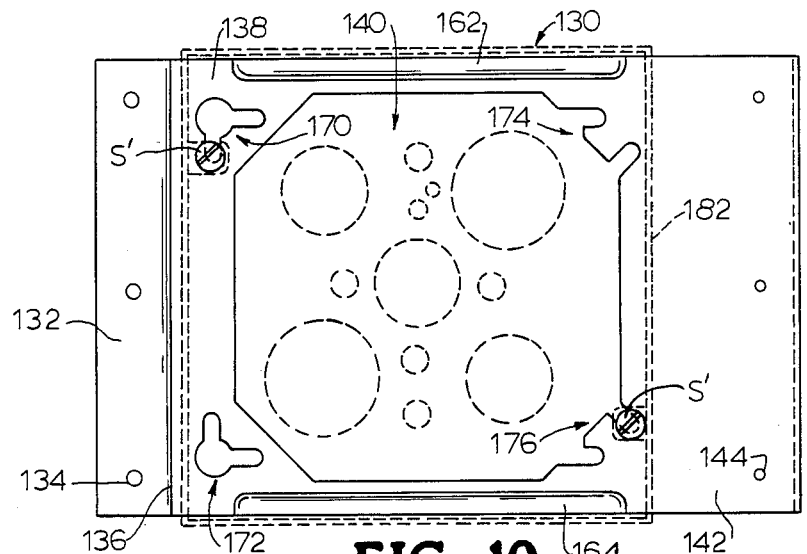
FIG. 10 is a front elevation view of the FIG. 7 bracket with a large size outlet box shown in dashed lines in a typical mounted position.
Figure 11:
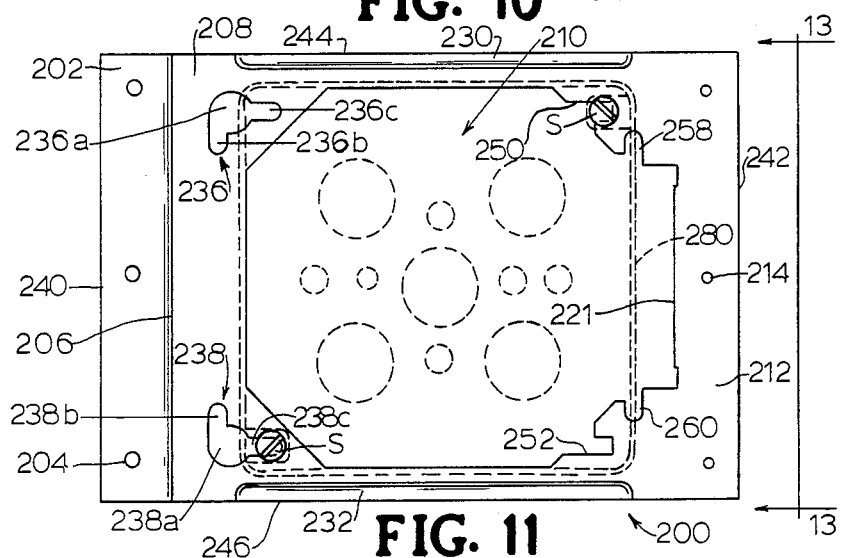
FIG. 11 is a front elevation view of a mounting bracket according to a fourth embodiment having a different slot arrangement from that illustrated in the prior figures, with an integral stiffening arm providing a generally T-shape and formed of the metal removed from the opening in the mounting bracket and with a small size box shown in dashed lines in a typical mounted position.
Figure 12:
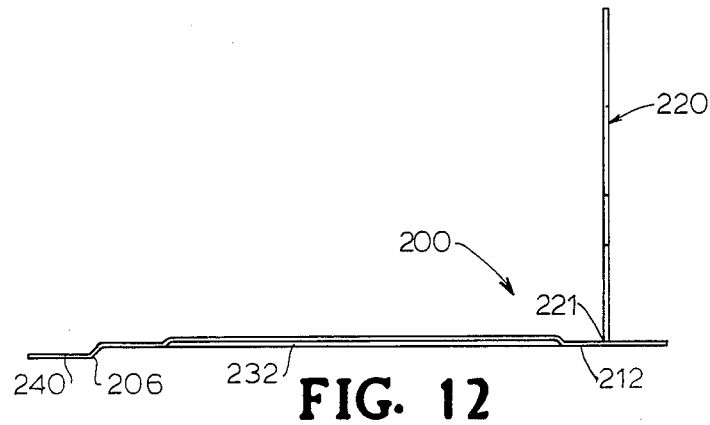
FIG. 12 is a top plan view of the FIG. 11 bracket.
Figure 13:
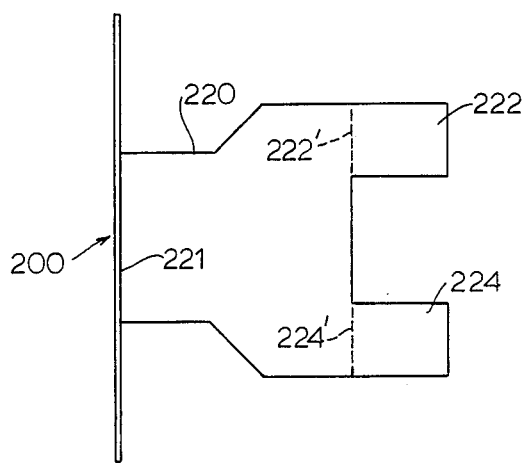
FIG. 13 is an end view of the stiffening arm taken in the direction of line 13—13 of FIG. 11.

The fourth embodiment mounting bracket designated 200 provides a different slot arrangement from that previously described and also provides a different stiffening arm arrangement from that shown in FIGS. 8 and 9. With particular reference to FIGS. 11-14, bracket 200 includes an end portion 202 containing a plurality of stud fastening holes 204 and adjoining an offset 206. Web portion 208 extends outwardly from offset 206 and contains the central opening 210 providing access to the outlet box secured to the mounting bracket 200. An end portion 212 at the opposite end of the bracket includes a plurality of holes 214 useful for attaching another bracket of the same type, a bracket of a different type, or an extension plate as previously described. A stiffening arm 220 is formed from the metal removed from the central opening 210 and is bent perpendicular to the plane of the web portion 208 and end portion 212 as best seen in FIG. 12. Stiffening arm 220 is formed with a pair of end portions 222, 224 bendable on line 222', 224' to accommodate to different spacings between walls on which bracket 200 is mounted. Formed depressions 230, 232 stiffen bracket 200 in the manner previously explained with reference to formed depressions 40, 42 of FIG. 1.

Figure 14:
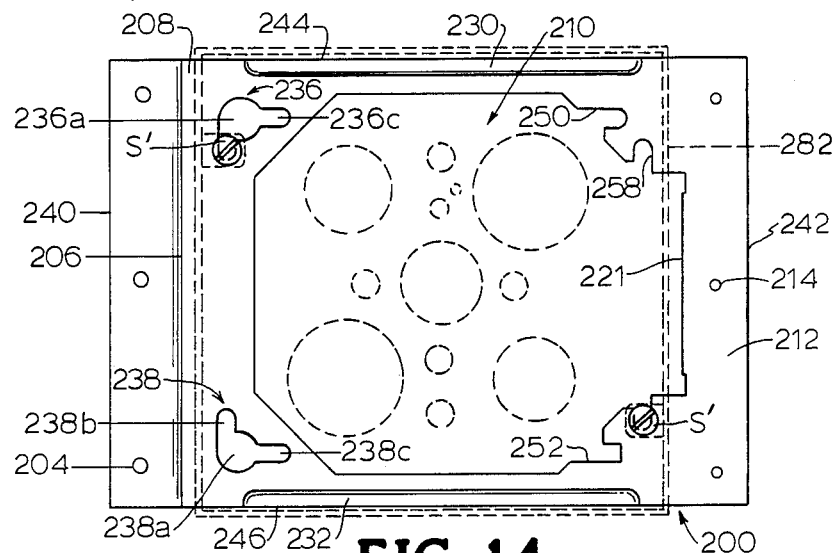
FIG. 14 is a front elevation view of the FIG. 11 bracket with a large size box shown in dashed lines in a typical mounted position.

Bracket 200 of the fourth embodiment includes a closed double interconnected keyhole slot 236 and a similar double interconnected closed keyhole slot 238. Slot 236 includes a screw head clearance opening 236a, a shank receiving slot 236b whose central axis is substantially parallel to bracket edges 240, 242 and a shank receiving slot 236c whose central axis is substantially parallel to edges 244, 246 of bracket 200. Slot 238 includes a screwhead clearance opening 238a. The central axis of shank receiving slot 238b is parallel to bracket edges 240, 242 whereas the central axis of shank receiving slot 238c is parallel to edges 244, 246 of bracket 200. At the opposite end of bracket 200 as best seen in FIGS. 11 and 14, the respective central axes of open ended slots 250, 252 are substantially parallel to bracket edges 244, 246 whereas the respective axes of open ended slots 258, 260 are substantially parallel to edges 240, 242 of bracket 200. Slots 250, 252 lead off from access opening 210 whereas slots 258, 260 are generally on the boundary of such opening.

From the prior description, it will be seen that a small size outlet box, designated 280 in FIG. 11, can be mounted as illustrated in FIG. 11 with the respective mounting screws S installed in the respective slots 238c and 250 as shown. In a similar manner, the large size outlet box, designated 282 in FIG. 14, can be installed with its respective mounting screws S' associated with respective slots 236b and 260 as further illustrated in FIG. 14. Stiffening arm 220 is used in the manner explained in the prior patents with end portions 222, 224 being bent as required to accommodate to the particular wall spacing of the walls on which bracket 200 is mounted. Stiffening arm 220 is formed from metal punched out to establish access opening 210 and is bent along line 221. A substantial reduction, in the range of 40%, of material required to form each individual bracket may be achieved.

In summary, it can be seen that the four embodiments provide outlet box mounting backets which both preserve the features of the prior patents and make possible an outlet box mounting bracket suited to mounting either a small or large size outlet box without removing the screws and without having to mount the associated dry wall ring until all wiring and joints within the outlet box have been completed. Accommodations to variations in the size of outlet boxes made by different manufacturers is now made possible by the slot arrangement of the invention which also permits small adjustments of the outlet box on the bracket after being installed. Maximum support strength and maximum size central opening are achieved with minimum material. The presence of the pair of formed depressions on opposite edges of the front wall adds considerably to the bracket's support strength though a single such formed depression could be employed for a light duty bracket. Overlapping of bracket material over the outlet box is minimized facilitating interconnection and pulling of wiring between outlet boxes with minimum exposure to damaging the wiring insulation.

I claim:

1. An integrally-formed electrical outlet box mounting bracket for supporting an electrical outlet box of either a standard small size having a corresponding small size opening and a single pair of diagonally-spaced screw tabs or a standard large size having a corresponding large size opening and two pairs of diagonally-spaced screw tabs and of the type carrying a pair of diagonally-spaced outlet box mounting screws mounted in a selected pair of diagonally-spaced screw tabs, comprising:
   (a) a front wall containing a substantially rectangular central opening of substantially the same size as the size of the opening of a standard small size box to register with the open side of an outlet box of either a standard small size or standard large size; and
   (b) said front wall having four groups of slots located outwardly of said opening substantially at the four corners thereof, each group containing a pair of slots sized to receive the shanks of the said outlet box mounting screws and being located and having the axes thereof oriented in such manner as to provide at least one diagonally-spaced pair of slots for receiving the shanks of a pair of diagonally-spaced mounting screws on a large size outlet box and at least one diagonally-spaced pair of slots for receiving the shanks of a pair of diagonally-spaced mounting screws on a small size outlet box such that the same said bracket is adapted to mount either size outlet box without requiring the removal of said mounting screws prior to being accepted by the respective said slots and without requiring the presence of a dry wall ring on the respective said pair of mounting screws to maintain the selected said outlet box on said front wall.

2. An integrally-formed electrical outlet box mounting bracket as claimed in claim 1 wherein at least two of the groups of said slots are closed.

3. An integrally-formed electrical outlet box mounting bracket as claimed in claim 1 wherein all of said groups of slots are closed and each group includes a common screw head clearance opening and leading therefrom shank-receiving slots with the axes thereof oriented in substantially perpendicular relation.

4. An integrally-formed electrical outlet box mounting bracket as claimed in claim 1 wherein two of the said groups of slots are closed and the other two of said groups of slots are open.

5. An integrally-formed electrical outlet box mounting bracket as claimed in claim 1 wherein at least two of the said groups of slots are open.

6. An integrally-formed electrical outlet box mounting bracket as claimed in claim 1 wherein at least two of the groups of said slots are open and the pairs of slots in each such group have the axis thereof arranged in perpendicular relation.

7. An integrally-formed electrical outlet box mounting bracket as claimed in claim 1 wherein at least two of the groups of said slots are open and the pairs of slots in each such group have the axis thereof arranged in non-perpendicular relation.

8. An integrally-formed electrical outlet box mounting bracket as claimed in claim 1 wherein said front wall includes at least one elongated support strengthening formed depression on a selected edge portion surrounding said front wall.

9. An integrally-formed electrical outlet box mounting bracket as claimed in claim 1 wherein said front wall includes a pair of elongated support strengthening formed depressions on selected opposed edge portions surrounding said front wall.

10. An integrally-formed electrical outlet box mounting bracket for supporting an electrical outlet box of either a standard small size having a corresponding small size opening and a single pair of diagonally-spaced screw tabs or a standard large size having a corresponding large size opening and two pairs of diagonally-spaced screw tabs and of the type carrying a pair of diagonally-spaced outlet box mounting screws mounted in a selected pair of diagonally-spaced screw tabs, comprising:

(a) a front wall containing a substantially rectangular central opening of substantially the same size as the size of the opening of a standard small size box to register with the open side of an outlet box of either a standard small size or standard large size; and (b) said front wall having a least four groups of screw access openings located outwardly of said central opening substantially at the four corners thereof, each group containing at least one screw access slot sized to receive at least the shank of a said outlet box mounting screw, the slots of said groups being located and having the axes thereof oriented in such manner as to provide at least one diagonally-spaced pair of screw access slots for receiving the shanks of a pair of diagonally-spaced mounting screws on a small size outlet box and at least one diagonally-spaced pair of screw access slots for receiving the shanks of a pair of diagonally-spaced mounting screws on a larged size outlet box such that the same said bracket is adapted to mount either size outlet box.

11. An integrally-formed electrical outlet box mounting bracket as claimed in claim 10, wherein said front wall includes at least one elongated support strengthening depression formed on a selected edge portion surrounding said front wall.

12. An integrally-formed electrical outlet box mounting bracket for supporting an electrical outlet box of either a standard small size having a corresponding small size opening and a single pair of diagonally-spaced screw tabs or a standard large size having a corresponding large size opening and two pairs of diagonally-spaced screw tabs and of the type carrying a pair of diagonally-spaced outlet box mounting screws mounted in a selected pair of diagonally-spaced screw tabs, comprising:

(a) a front wall containing a substantially rectangular central opening of substantially the same size as the size of the opening of a standard small size box to register with the open side of an outlet box of selected small or large size;

(b) said front wall having screw access openings substantially at the four corners thereof and formed to provide at least one diagonally-spaced pair of openings for receiving the shanks of a pair of diagonally-spaced mounting screws on a large size outlet box and at least one diagonally-spaced pair of openings for receiving the shanks of a pair of diagonally-spaced mounting screws on a small size outlet box such that the same bracket is adapted utilizing said mounting screws to mount either a small or large size outlet box; and (c) said front wall includes a selected number of but at least one elongated support strengthening formed depression on a selected edge portion surrounding said front wall.

13. An integrally-formed electrical outlet box mounting bracket as claimed in claim 12 wherein said front wall includes a pair of said elongated support strengthening formed depressions on selected opposed edge portions surrounding said front wall.

14. An integrally-formed electrical outlet box mounting bracket as claimed in claim 12 wherein said screw access openings are formed such that said screw access openings at each said corner includes a pair of screw shank receiving slots.

* * * * *